(12) United States Patent
Manson et al.

(10) Patent No.: US 7,168,971 B2
(45) Date of Patent: Jan. 30, 2007

(54) GASKET RETAINER

(75) Inventors: Carey M. Manson, Mound, MN (US); Gary B. Rotegard, Apple Valley, MN (US)

(73) Assignee: Qlogic Corporation, Aliso Viejo, CA (US)

(*) Notice: Subject to any disclaimer, the term of this patent is extended or adjusted under 35 U.S.C. 154(b) by 123 days.

(21) Appl. No.: 11/140,891

(22) Filed: May 31, 2005

(65) Prior Publication Data

US 2006/0279937 A1 Dec. 14, 2006

(51) Int. Cl.
*H01R 13/52* (2006.01)

(52) U.S. Cl. ................................. 439/271; 439/939

(58) Field of Classification Search ............. 439/271, 439/939, 607, 88, 559
See application file for complete search history.

(56) References Cited

U.S. PATENT DOCUMENTS

| 5,158,391 | A  | * | 10/1992 | Fujitani et al. ............. 403/288 |
| 5,779,493 | A  | * | 7/1998  | Tomita et al. .............. 439/271 |
| 6,095,862 | A  | * | 8/2000  | Doye et al. ................. 439/607 |
| 6,478,622 | B1 | * | 11/2002 | Hwang ....................... 439/607 |
| 6,533,612 | B1 | * | 3/2003  | Lee et al. ................... 439/607 |
| 6,822,879 | B2 | * | 11/2004 | Rathnam et al. ............ 361/818 |
| 6,921,292 | B2 | * | 7/2005  | Miyazaki .................... 439/564 |
| 6,953,357 | B2 | * | 10/2005 | Fukushima et al. ......... 439/271 |
| 7,104,843 | B2 | * | 9/2006  | Olson et al. ................ 439/607 |

* cited by examiner

*Primary Examiner*—Phuong K T Dinh
(74) *Attorney, Agent, or Firm*—Klein, O'Neill & Singh, LLP

(57) ABSTRACT

A gasket retainer is mounted on a connector body to hold a rounded conductive gasket in position around an open end of the connector body. The gasket retainer has an elongated body with an upper surface, a lower surface and a central open portion to form an outer peripheral portion, surrounding the central open portion, having two side edges and two end walls. Gasket retaining portions, which may be a number of fingers extend upwardly away from the upper surface of the two side edges and recesses are formed in the two end walls to allow holding portions on the connector body to secure the retainer adjacent the open end with the rounded conductive gasket held in position, flush against the connector body to improve the shielding effectiveness in fibre channel SFP transceiver electro magnetic compatibility when connected.

20 Claims, 4 Drawing Sheets

GASKET RETAINER

BACKGROUND OF THE INVENTION

1. Field of the Invention

This invention generally relates to holding devices, and more particularly, to an improved holder or retainer for a gasket to more precisely and securely hold gaskets in place on a connector body to ensure proper alignment and insertion in a bezel or the like on an electronic, electrical, or fiber optic devices.

2. Description of the Prior Art

It is well known that when connecting components of electronic, electrical or fiber optic devices together, conducting gaskets must be used to ensure a secure and tight seal, to form a proper conductive connection. Furthermore, it is well known to use non-conducting gaskets to fluidly seal together many other types of components so as to provide leak proof seals. Additionally, since gaskets have a tendency to lose their shape or to wear out during handling and usage, and it is expensive and time consuming to replace such gaskets. Therefore, there is a need for a fence or holding means to retain the shape of such gaskets and to aid in keeping them flush against connector bodies during compression.

Known devices for keeping gaskets in position during compression, such as in the coupling of conduits, or the like, usually include some type of compression fitting that forces the gasket inwardly as the conduits are being secured together. Such compression fittings usually include threaded portions and/or tapered portions on the inside of the conduits that force or urge the gasket against an inside diameter or wall when the conduits are screwed or otherwise secured together. Additionally, when fibre channel SFP transceivers are being connected flat washer-type devices are used to hold conductive gaskets in place.

The known compression fittings are useful in many situations and the flat washer-type devices are useful in some situations, however, they do not act to properly hold round or semi-circular conductive gaskets in a position flush against a connector body when securing components together in electronic, electrical or fiber optic devices, and particularly in the case of connecting fibre channel SFP transceivers, wherein the shielding effectiveness and the electromagnetic compatibility may be compromise if the gaskets bow or are otherwise pushed outwardly, away from the connector body.

Furthermore, known compression fittings use compressive forces that would over-stress or wear-out conducting gaskets or a conducting surface applied to such conducting gaskets. Therefore, there exists a need in the art for a holding or retaining device that is easy to use and which more accurately and securely holds or retains in place a conducting gasket used when connecting components of electronic, electrical or fiber optic devices, without unduly stressing or compressing such conducting gaskets.

SUMMARY OF THE INVENTION

Accordingly, it is a general object of the present invention to provide an improved gasket retainer. It is a particular object of the present invention to provide an improved gasket retainer for use with conducting gaskets. It is a further particular object of the present invention to provide an improved gasket retainer having a upstanding edge portions or fingers to more accurately align and hold a conducting gasket to a connector body when securing the connector body to a further component. It is a yet another particular object of the present invention to provide an improved gasket retainer having a stainless steel body with a plurality of recessed areas and a plurality of fingers formed extending from the body to keep a conducting gasket flush to a connector body when securing the connector body to a further component, such as in a bezel in an electronic, electrical or fiber optic device and to more precisely fill a gap or opening between the bezel and the connector body inserted therein so as to improve the shielding effectiveness.

In accordance with one aspect of the present invention, there is provided a gasket retainer comprising a substantially elongated body having upper and lower surfaces with a central open portion connecting the upper and lower surfaces so as to form an outer peripheral portion having two side edges and two end walls. An upstanding gasket retaining portion is formed on or secured to the two side edges for more securely holding or retaining a gasket in position. Each of the two end walls have at least one indentation or recess connected to the central open portion and adapted to be held on a connector body for holding the gasket retainer to the connector body.

The gasket retainer of the present invention is preferably used with a connector body having a plurality of holding and securing portions to accurately hold and support the gasket retainer and a round gasket in position on the connector body adjacent an open connecting end.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein like reference numerals are used throughout the several views, and, in which:

DESCRIPTION OF THE PREFERRED EMBODIMENTS

Figure 1:
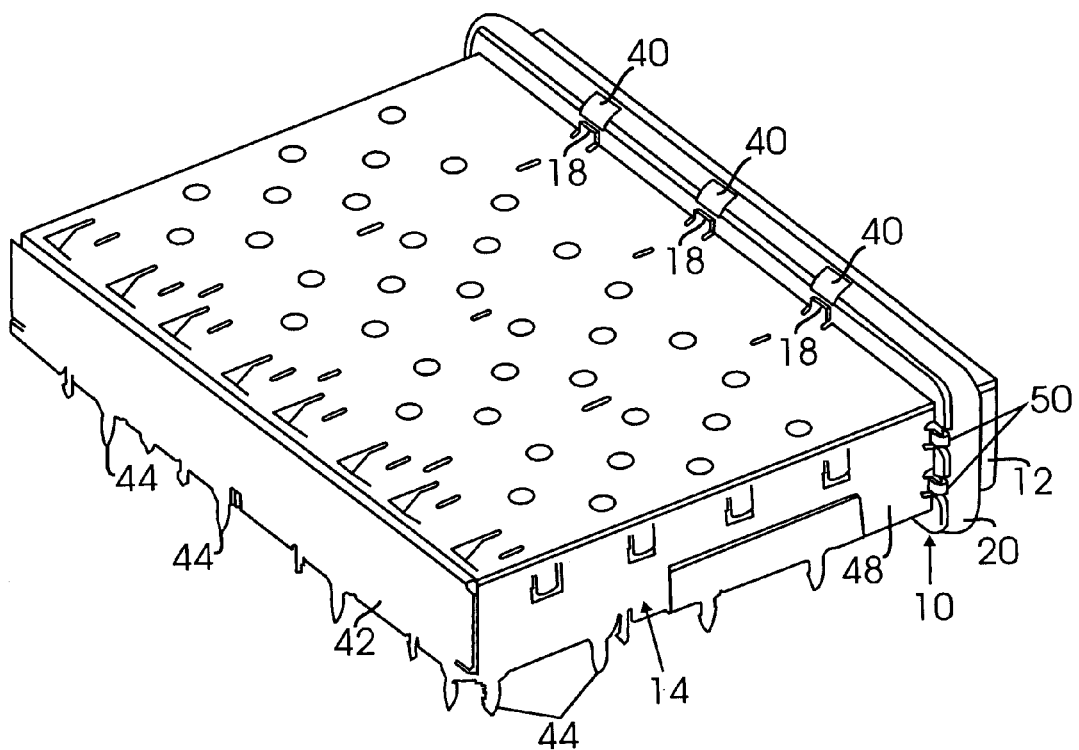
FIG. 1 is a perspective view, taken from a first end, of a connector body having an embodiment of a gasket retainer of the present invention holding a gasket flush to the connector body, for insertion into another component.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved gasket retainer or holding device to be used in precisely aligning and securing gaskets to connector bodies. The gasket retainers of the present invention may be used to hold any gasket in position, but are particularly useful in holding conductive gaskets flush to a connector body for insertion into bezels on faceplates on electronic, electrical or fiber optic devices, such holding round or circular, silver coated EMI gaskets on 1×4 or 1×5 Molex SFP connector bodies (from Molex, Inc. of Lislie, Ill.) to fill in gaps on bezels held on components or devices to which the connector bodies are attached. By the use of the gasket retainers of the present invention, a surprising and substantial improvement in shielding effectiveness in fibre channel SFP transceiver electromagnetic compatibility is obtained.

A currently preferred embodiment of a gasket holder or retainer of the present invention for use on connector bodies is shown at 10 in the drawings. The holder or retainer 10 is placed on and secured in place on a first end 12 of a connector body 14 and held in position thereon by holding or securing elements 16 and tabs or portions 18, extending from opposed side walls of the connector body, to align the holder or retainer and a gasket 20 at the first end 12, adjacent to and around an opening or throat 22. The end 12 and throat 22 are adapted to be inserted in and electrically connected to a further opening, such as a bezel (not shown), on a further component of an electronic, electrical or fiber optic device.

Figure 2:
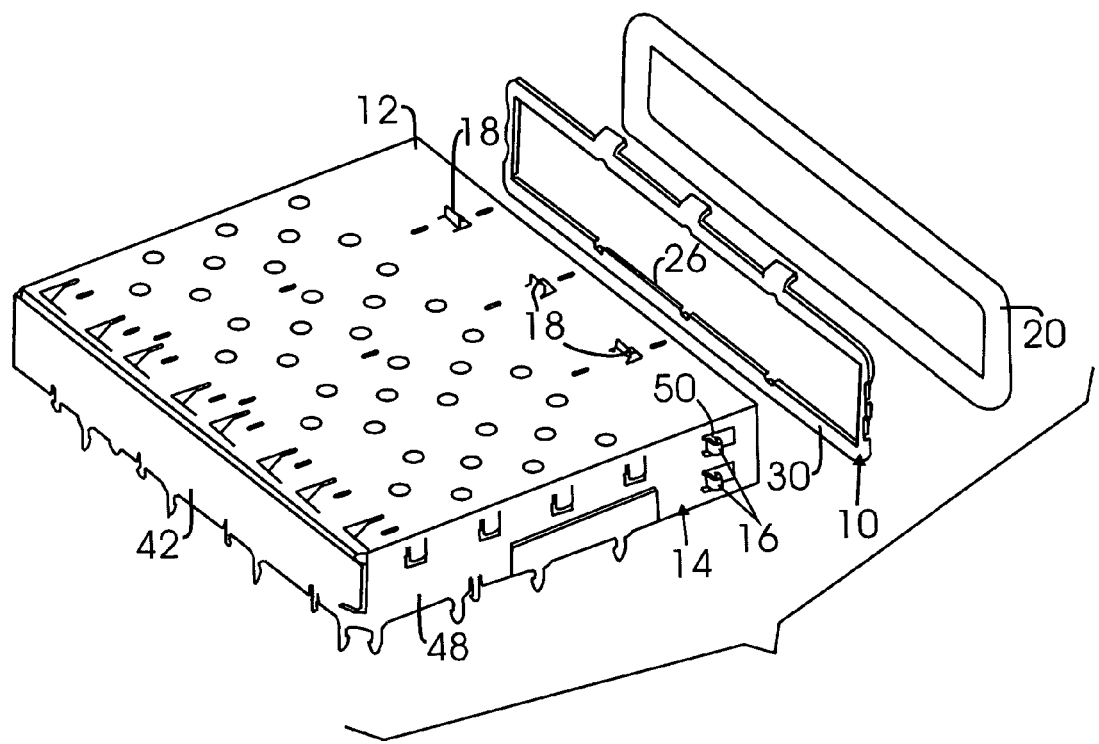
FIG. 2 is an exploded view of the connector body, gasket retainer and gasket of FIG. 1.
Figure 3:
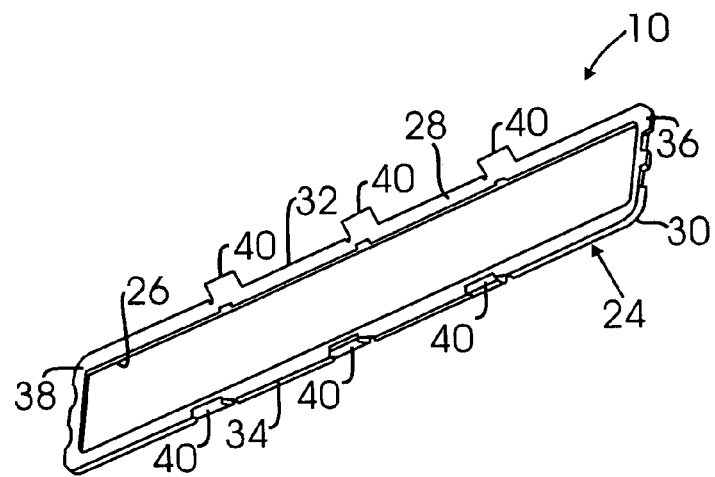
FIG. 3 is an enlarged perspective view of one embodiment of the gasket retainer of the present invention.
Figure 4:
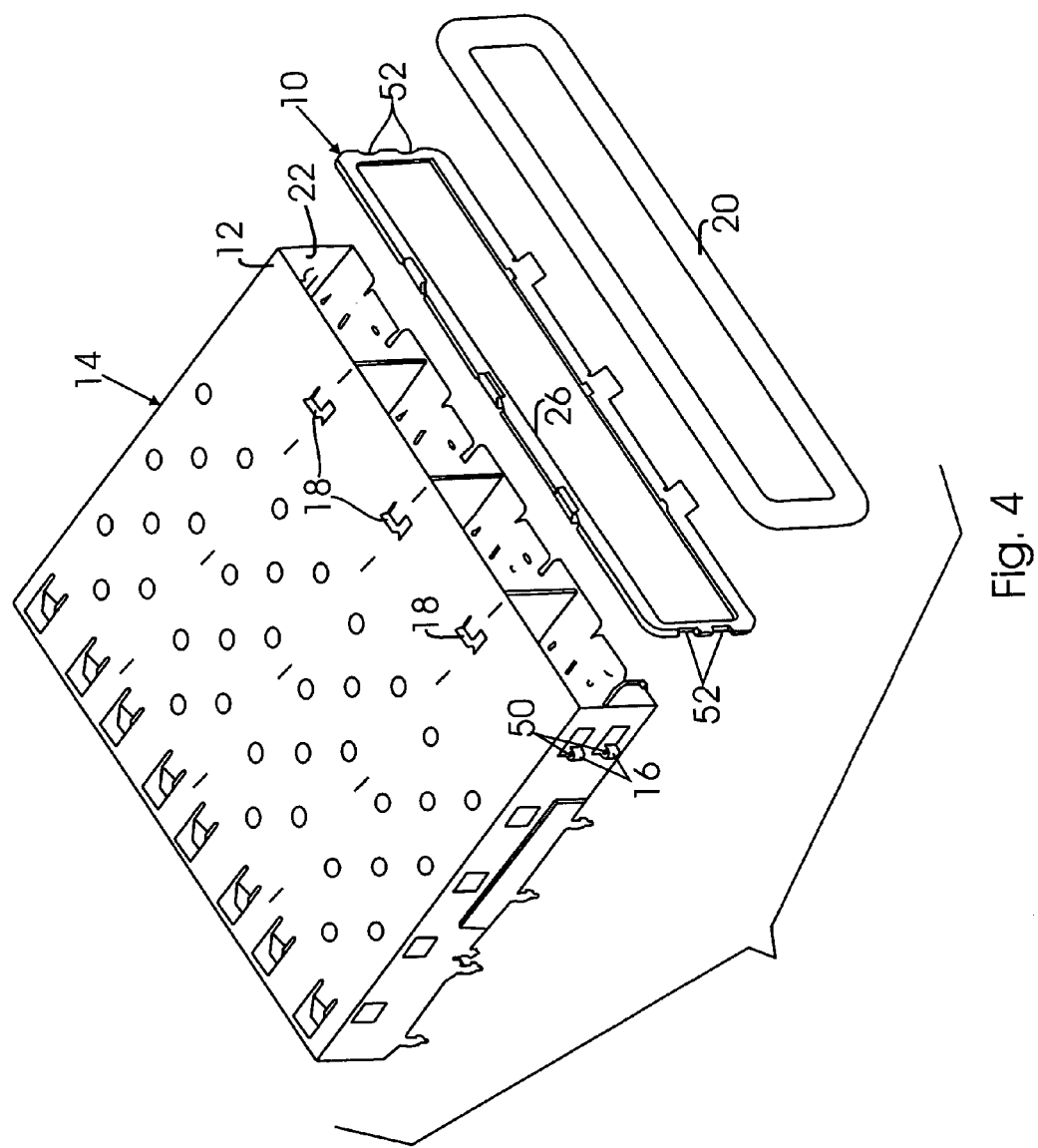
FIG. 4 is a further exploded view of the connector body, gasket retainer and gasket, looking from an opposite end of the connector body shown in FIG. 1.

As best shown in FIGS. 2–4, the holder or retainer 10 includes a substantially elongated body 24 having a central aperture, open portion or opening 26 extending between an upper surface 28 and a lower surface 30. An outer peripheral edge comprised of two parallel side portions 32, 34 and two end walls 36, 38, surrounds and encloses the central opening 26. A gasket retaining portion 40 comprised of a plurality of arms or fingers is attached to or formed integrally with each of the two parallel side portions 32, 34, along an outside edge. These gasket retaining portions 40 may take any desired form, such as the three fingers shown in the drawings extending upwardly, away from the top surface 28 of each side portion 32, 34. The three fingers 40, shown for purposes of illustration only and not by way of illustration, are evenly spaced apart along each side portion and face a complementary finger across from it on the opposite side portion, to securely hold or retain the gasket 20 in position, flush against opposed sides of the connector body 14. However, the number of fingers 40 on each side could range from 3 to 10 and in some instances could be replaced by an upstanding lip, strip or wall on each side portions 32, 34. The gasket retaining portions 40 may be formed substantially perpendicular to the side portions 32, 34, angled slightly away from the central opening 26, or may be outwardly curved, away from the central opening, so that they cup or support the rounded exterior of the gasket 20, without marking or marring the conductive coating on the gasket. Whether or not fingers or a single strip is used, as well as the number of fingers used on each side portion may vary, as needed, depending on the size of the connector body 14 and the gasket 20.

Figure 5:
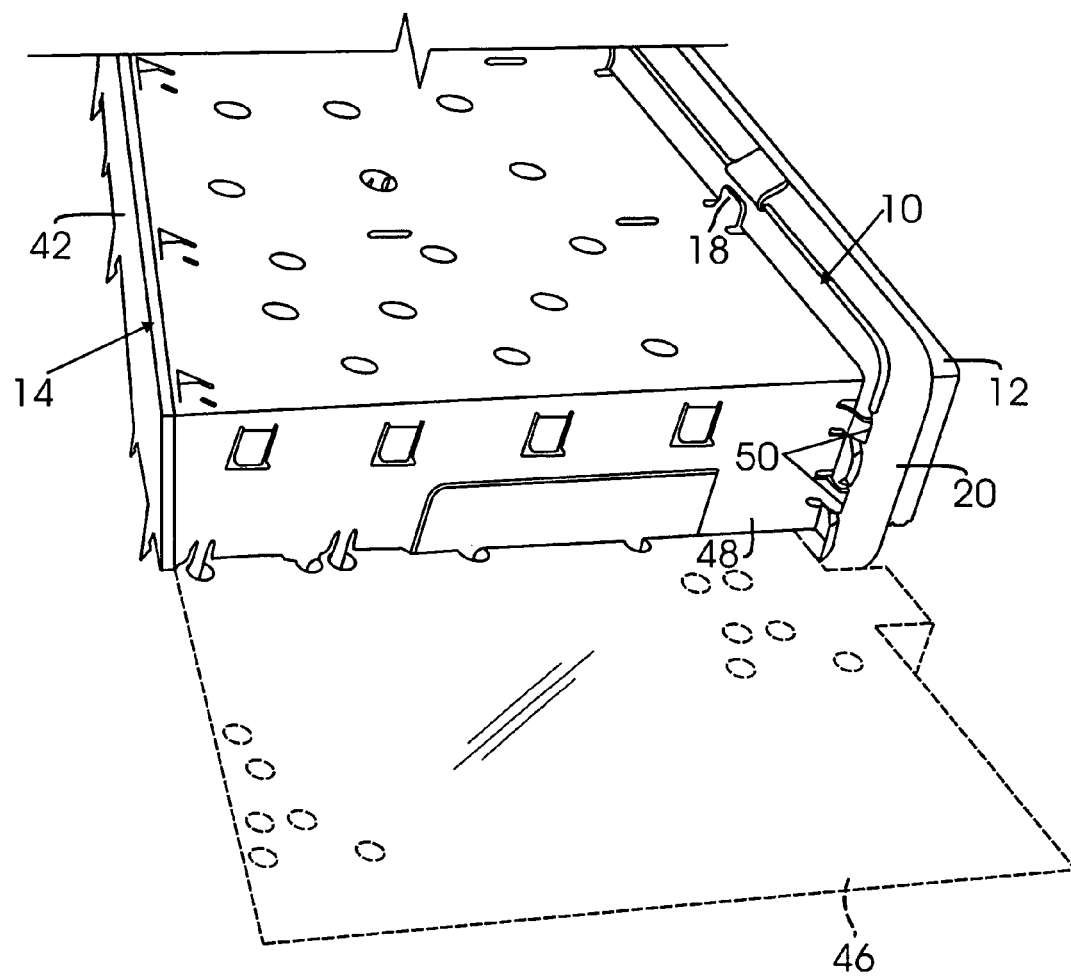
FIG. 5 is a partial perspective view of the connector body, gasket retainer and gasket of FIG. 1 secured to a device, such as a circuit board.

The connector body 14 includes a second or closed end 42, and may have a plurality of pins or the like 44 for insertion in openings or apertures formed in a board or plate 46 (see FIG. 5).

As is best shown in FIGS. 1, 2, 4 and 5 the holding or securing elements 16 on end walls 48 of the connector body 14 include holding or locking portions 50 which fit or snap over the end walls 36, 38 of the holder or retainer 10. These holding or locking portions 50 are held in indentations or recesses 52 formed in the end walls 36, 38, facing away from the central opening 26, to cooperate with and hold the end walls and, therefore, the holder or retainer 10, in position against the tabs 18 on the opposed side walls at the open end 12 of the connector body 14 with the fingers 40 retaining the gasket 20, flush against the walls of the connector body.

In a currently preferred embodiment of the invention, the holder or retainer 10 and connector body 14 are made from a conductive metal, with the holder or retainer 10 being made from a stainless steel for strength and durability.

There has thus been described a gasket holder or retainer that is adapted to be mounted on a connector body. The gasket holder or retainer is adapted to hold a rounded conductive gasket in position, flush against the connector body, around an open end by means of gasket retaining portions, such as a plurality of holding fingers or opposed strips. The open end of the connector body and the gasket held in the retainer are accurately inserted in a bezel or the like on a further component so as to make a positive and enhanced connection between the connected components.

Those skilled in the art will appreciate that various adaptations and modifications of the just-described preferred embodiments may be configured without departing from the scope and spirit of the invention. Therefore, it is to be understood that, within the scope of the appended claims, the invention may be practiced other than is specifically described herein.

What is claimed is:

1. A gasket retainer comprising:
    an elongated body having an upper surface and a lower surface with a central open portion formed in the elongated body between the upper surface and the lower surface;
    an outer peripheral portion having two side edges and two end walls surrounding the central open portion;
    gasket retaining portions extending from the upper surface of the two side edges; and
    at least one recess formed in the two end walls, facing away from the central open portion.

2. The gasket retainer of claim 1 wherein the two side edges are substantially parallel to each other.

3. The gasket retainer of claim 1 wherein the two end walls have two recesses formed therein.

4. The gasket retainer of claim 1 wherein the elongated body is made from stainless steel.

5. The gasket retainer of claim 1 wherein the gasket retaining portions are comprised of a plurality of fingers.

6. The gasket retainer of claim 1 wherein the gasket retaining portions are comprised of a plurality of fingers which extend substantially perpendicularly from each of the two side edges.

7. The gasket retainer of claim 6 wherein the two side edges are substantially parallel to each other.

8. The gasket retainer of claim 7 wherein each of the two end walls have two recesses formed therein.

9. The gasket retainer of claim 8 wherein the elongated body is made from stainless steel.

10. The gasket retainer of claim 9 wherein the plurality of fingers are evenly spaced on each of the two side edges.

11. A combination gasket retainer and connector body comprising:
    the gasket retainer has an elongated body having an upper surface and a lower surface with a central open portion formed in the elongated body between the upper surface and the lower surface;
    an outer peripheral portion having two side edges and two end walls surrounding the central open portion;
    a gasket retaining portion extending from the upper surface of each of the two side edges; and
    at least one recess formed in the two end walls, facing away from the central open portion; and the connector body has a first open end and a second closed end with a plurality of tabs and holding portions formed in the connector body to accurately hold and support the gasket retainer in a position for retaining a gasket in the gasket retaining portion extending from each of the two side edges on the connector body around the open first end.

12. The combination gasket retainer and connector body of claim 11 wherein each gasket retaining portion is comprised of a plurality of fingers that are evenly spaced along each of the two side edges of the gasket retainer.

13. The combination gasket retainer and connector body of claim 12 wherein the two side edges of the gasket retainer are substantially parallel to each other.

14. The combination gasket retainer and connector body of claim 13 wherein the elongated body is made from stainless steel.

15. The combination gasket retainer and connector body of claim 14 wherein each of the two end walls have two recesses formed therein.

16. The combination gasket retainer and connector body of claim 15 wherein the evenly spaced fingers on each of the two side edges extend substantially perpendicularly away from the upper surface.

17. The combination gasket retainer and connector body of claim 12 wherein the holding portions are formed on end walls of the connector body and comprise holding elements having locking portions which fit over the two end walls of the gasket retainer and are held in the two recesses.

18. A combination gasket retainer, gasket and connector body comprising:
a substantially round conductive gasket;
the gasket retainer having an elongated body having an upper surface and a lower surface with a central open portion formed in the elongated body between the upper surface and the lower surface;
an outer peripheral portion having two side edges and two end walls surrounding the central open portion;
a gasket retaining portion comprised of a plurality of fingers extending from the upper surface of the two side edges; and
at least one recess formed in the two end walls, facing away from the central open portion; and
the connector body having a first open end and a second closed end with a plurality of tabs and holding portions formed in the connector body to accurately hold and support the gasket retainer in a position to support and retain the substantially round conductive gasket on the connector body around the first open end.

19. The combination gasket retainer, gasket and connector body of claim 18 wherein the plurality of fingers are evenly spaced apart and extend substantially perpendicularly away from the upper surface; the two side edges of the gasket retainer being substantially parallel to each other; the elongated body being made from stainless steel; and the two end walls have two recesses formed therein.

20. The combination gasket retainer, gasket and connector body of claim 19 wherein the holding portions are formed on end walls of the connector body and comprise holding elements having locking portions which fit over the two end walls of the gasket retainer and are held in the two recesses.

* * * * *